Jan. 18, 1955 W. LOCKEMANN ET AL 2,700,067
APPARATUS FOR MAGNETICALLY STORING TELEPRINTER SIGNALS
Filed March 3, 1953
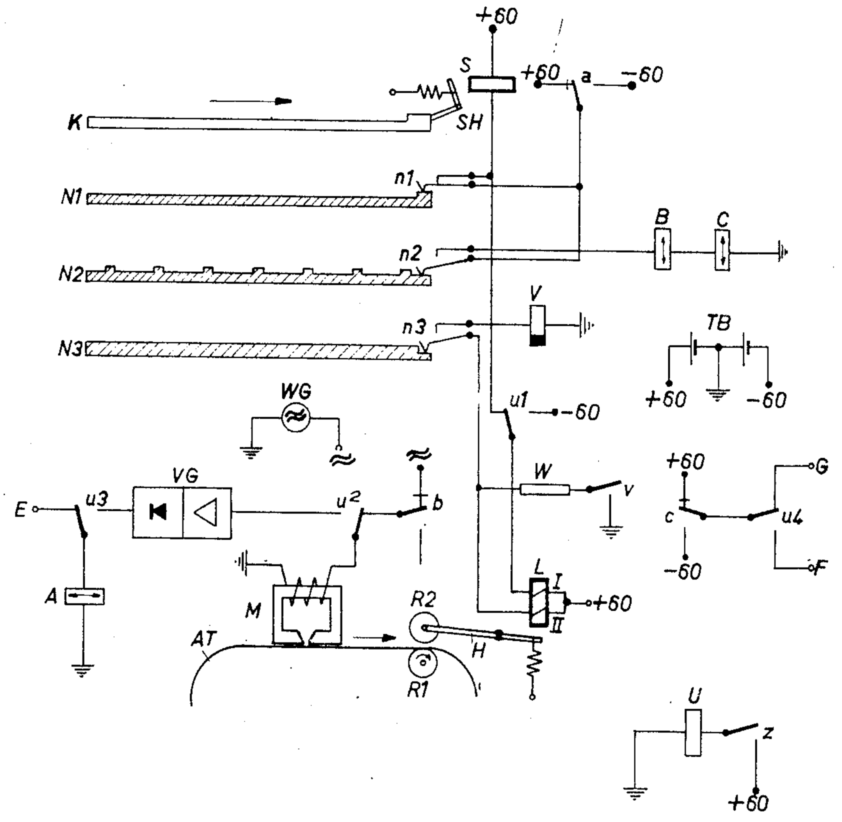
Inventors.
Wilhelm Lockemann, &
Camillo Bodenstein.
By. [signature] Atty.

2,700,067
Patented Jan. 18, 1955

2,700,067

APPARATUS FOR MAGNETICALLY STORING TELEPRINTER SIGNALS

Wilhelm Lockemann, Haar, near Munich, and Camillo Bodenstein, Munich, Germany, assignors to Siemens & Halske, Aktiengesellschaft, Munich, Germany, a corporation of Germany Application March 3, 1953, Serial No. 340,086
Claims priority, application Germany March 5, 1952
8 Claims. (Cl. 178—17.5)

This invention is concerned with apparatus for magnetically storing upon magnetizable carriers groups of impulses, especially impulses in teleprinter operation.

The advantage of employing such storage means as compared with the perforated tape customarily employed in the teleprinter technique is, in view of the possibility of repeated use of the magnetizable carrier, in the saving of material, avoidance of punching waste, and by suitable arrangement of erasing devices in the avoidance of pauses which are in operation caused by the insertion of transmission tapes.

The perforated tape offers on the other hand the advantage of permitting transmission of the teleprinter or other signals or impulse groups stored thereon without unnecessary delay or introduction of pauses and with greater speed—even if the punching of the perforated combinations is carried out, for example, by direct manual scanning in irregular sequence and with prolonged pauses—and that distortions are necessarily corrected incident to the retransmission of the punched signals.

The suggestion has been made before to utilize these basic advantages of the perforated tape method of operation for the magnetic storing of impulses by stopping the magnetic signal carrier always in the intervals between impulse groups. However, the signals to be retransmitted are easily distorted in such operation because the signal carrier which is being stopped during the intervals between impulse groups must always be accelerated anew during the first start signal of the respective successive impulse group and the recording of the first start is thereby falsified.

Another suggestion proposes to provide the magnetizable signal carrier with a predetermined screening which is approximated to the stepping speed of the impulses to be recorded and which causes by central scanning, analogous to the mechanical correction of distortion, a retransmission of the stored signals with a predetermined accurate time screening thus providing for correction of distortion of the signals. This method requires especially prepared signal carriers which are either inapplicable or undesirable in each and every case.

The object of the invention is to retain in the magnetic storing of impulse groups, especially teleprinter signals in start-stop operation of the magnetizable signal carrier, the use of normal types of signal carriers while making it possible to retransmit the stored impulse groups without additional distortion or even with a correcting effect.

This object is realized by recording the impulses with the use of delay means and always effecting the release of the shift or advance motion of the signal carrier without delay so that it operates at full speed at the start of the corresponding impulse record.

In accordance with the invention, known impulse correcting devices preferably in the form of single-shaft mechanical teleprinter pulse correcting devices may be used as a delay means, such means also correcting distortion of the impulses or signals to be stored with the delay required for the recording thereof.

In accordance with the invention, the correction of distortion of the impulses may also be effected incident to the reproduction of the stored impulses by the use of distortion correcting devices, for example, devices of the type indicated before.

The identical impulse correcting device may thus be employed for the correction of the signals upon recording as well as upon reproduction thereof, and may be switched in coincident with the switching-in of the corresponding magnetic recording and reproducing devices.

The accompanying drawing shows an example of a simple embodiment of the invention in the form of a schematic circuit diagram of a magnetic storing device for teleprinter signals coacting with a single-shaft mechanical teleprinter signal corrector of known structure for the purpose of introducing recording delays and correcting signal distortion.

Referring now to the drawing, the magnetic storing device comprises the magnetic head M, which may be selectively used as a record and as a reproduce head, and a magnetic record carrier AT, for example, a tape which is moved at suitable speed relative to the air gap of the head M in the direction of the arrow. The advance is effected by a drive roller R1, which is rotated at constant speed, only at times when the clutch or pressure roller R2, which is journalled in a spring biased lever H is pressed against the drive roller R1 responsive to actuation of the lever by the clutch magnet L.

The drive of the drive roller R1 and the unwinding as well as the rewinding of the tape AT may be carried out in desired and known manner and have therefore not been illustrated.

It is of course also possible to effect the periodic advance of the tape AT in other suitable manner, for example, by constant pressure engagement of the roller R2 with the tape and the latter in contact with the drive roller R1 while actuating by means of the magnet L a start-stop clutch for the drive roller R1.

The single-shaft mechanical teleprinter signal correcting device comprises a coupling disk K and three control cam disks N1, N2 and N3 mechanically coupled therewith. These disks are for reasons of simplification shown in developed views. The drive is effected in known manner, therefore not shown, for example, over a slip clutch which attempts to rotate the disks continuously but is prevented from doing it by a locking lever SH which engages in a normal position a locking tooth on the coupling disk K. The operative release, always for one rotation (the so-called start) is effected when the locking lever SH is moved into release or start position by the actuation of the electromagnet S.

Cam switches *n*1, *n*2, *n*3 are respectively associated with the cam disks N1, N2, N3. These switches are in normal or resting condition of the correcting device in the illustrated contact positions and are operated by the associated cams during the rotation thereof in the direction of the arrow shown above the coupling cam K.

The teleprinter signals or impulses to be stored and to be as desired retransmitted are delivered over the line or inlet terminal E which is in the illustrated position of the contact *n*3 of a switch (to be presently described) connected with a telegraph relay A of customary construction. The teleprinter signals may come either directly from a manual transmitter or a desired other transmitter or from a remote sender over a transmission channel of desired kind.

The telegraph relay A is actuated upon receipt of a teleprinter signal, moving its switch or contact *a* from the illustrated spacing position into the alternate marking position. In the spacing position, the contact *a* is connected with the positive pole +60 and in the marking position with the negative pole −60 of a subdivided battery TB which is centrally grounded.

As soon as the contact spring or switch arm *a* assumes its alternate marking position, a circuit is closed for the release magnet S over the cam contact *n*1 of the correcting device in normal position thereof, causing this magnet to energize and to lift the locking lever SH thus releasing the device for one revolution.

A circuit is at the same time closed for the energization of winding I of the clutch or tape advance magnet L over the resting position of the contact *n*1. The magnet or relay L operates its armature to actuate the lever H so as to press roller R2 against the continuously rotating drive or tape advance roller R1. The advance of the tape AT is thus initiated upon receipt of the incoming start signal and prior to recording such signal.

The cam contact $n1$ is opened by the cam N1 immediately after the start of the rotation and the release or start magnet S is thereby disconnected. The cam contact $n2$ is temporarily closed by the cam disk N2 for an accurately defined interval after start of rotation of the correction device. This interval amounts in the case of normal teleprinter symbols with a stepping length of 20 ms. approximately to 10 ms. so that the "scanning" of the start step or signal takes place midway thereof. The succeeding cams of the cam disk N2 are formed so that the succeeding steps or signals of the teleprinter symbol are similarly scanned midway always by a spacing of 20 ms. Distorted signals are thus in known manner corrected upon receipt thereof. The retransmission of the signals or impulses scanned in this manner is effected by means of telegraph relays B and C which are always during the short closure times of the contact $n2$ connected with the armature or contact $a$ of the line relay A and which assume the corresponding marking or spacing position in accordance with the position of the armature $a$.

The telegraph relay B effects the magnetic storing of the received impulses first, by moving the contact or armature $b$ incident to the start signal of the corresponding teleprinter symbol from the illustrated spacing position into the marking position and then upon receipt of further characteristic signals or impulses of the symbol in similar manner either into the marking or into the spacing position. In the spacing position, the contact $b$ completes the connection with an alternating current source WG which delivers an energizing current of suitable frequency to the winding of the magnetic head M. The alternating current source is disconnected in the marking position. Accordingly, the spacing current steps are marked on the tape AT by alternating current magnetization while the marking impulse steps are marked thereon by the absence of such magnetization.

The circuit of the energizing winding I of the tape advance or clutch magnet L is interrupted incident to the interruption of the circuit of the start magnet S upon opening of the cam contact $n1$ shortly after start of rotation of the signal correction device. The advance of the tape must, however, be maintained for the entire impulse series and the advance or clutch magnet is therefore provided with a second winding II which is energized in a circuit extending over the cam contact $n3$ and a relay V. The contact $n3$ is closed shortly before opening of the cam contact $n1$ and the winding II of the magnet L is therefore energized in series with the auxiliary relay V which also energizes. The magnet L is in this manner maintained energized for the duration of the rotation of the distortion correcting device and until such device is stopped. The relay V operates its contact $v$, thereby preparing an auxiliary circuit for L over the resistor W.

The cam contact $n3$ opens when the correcting device completes its rotation and the circuit for the relay V is accordingly interrupted. Relay V is slow-to-release and keeps its contact $v$ closed for an interval after its circuit is interrupted so as to maintain the energizing circuit for the magnet L beyond the instant of stopping of the correction device, thereby assuring the complete recording of the stop signal. The tape advance or clutch magnet L becomes deenergized after restoration of the relay V to restore the lever H to the position shown, thereby stopping the tape AT until such a time when the next start signal is received.

The telegraph relay C in series with the relay B is not necessary for the above described impulse recording operations but may be advantageously used for transmitting the received signals over its contact $c$ and the contact $u4$ to a printer connected to the terminal G so as to permit reading of the message while it is being transmitted and recorded.

The above described apparatus secures the undistorted recording of the teleprinter symbols on the tape AT since the tape advance becomes effective upon receipt of the start signal, while the recording thereof begins later, for example, 10 ms. later due to the relay determined by the cam disk N2. This interval is sufficient for accelerating the tape AT to its proper operating speed. The required suppression of the pauses between successive symbols is secured by stopping of the tape AT and by starting it again independently of the duration of the pauses always by the start signal of the next following symbol.

It is possible by using a sufficiently accurately working drive for the advance of the tape AT and by employing a suitable tape speed to pick up or reproduce the stored signals or impulses directly from the moving tape for transmission without distortion correction devices to a line or to a receiver. The speed of the tape and the requirements as to uniformity of its speed may be appreciably reduced by effecting a repeated distortion correction at the time of reproducing the stored symbols. It is possible to store in this manner a multiple of messages on a tape of given length than would be otherwise feasible.

The possibility of repeated distortion correction of the stored symbols upon reproduction and retransmission is also indicated in the illustrated example. A simple circuit is used to keep expenditures low which permits to use the identical distortion correction device employed for the recording after corresponding switching over for the reproducing and retransmission.

The switching over is effected by the relay U which is connected to the current source by a switch $z$ in accordance with the switching steps required for the reproducing. The relay U is accordingly energized and switches its contacts $u1$ to $u4$ from the illustrated positions into the respective alternate positions. The tape advance or clutch magnet L is thereby energized over its winding I in a circuit including contact $u1$ and this magnet operates the lever H so as to start the advance of the tape AT as described before.

The contact $u2$ switches the magnetic head M which operated during the recording as a record head over to operate as a pickup or reproduce head or effects the switching in of a separate pickup reproduce head so that the voltages induced in the winding of the magnetic head from the magnetizations of the tape AT appear in the inlet of an amplifier VG which is provided with a rectifier terminal stage. The direct current impulses appearing at the amplifier output are preferably double-current impulses and are conducted to the contact $u3$ which is in operated position and from there to the telegraph relay A.

The telegraph relay A transmits the picked up impulses by means of its armature $a$ in the previously described manner to the distortion correcting device. The latter is therefore again released with each start signal of a stored teleprinter symbol and transmits such signal and also the further signal impulses undistorted to the relays B and C. The actuation of the relay B is in such a case without effect since the contact $b$ is disconnected from the magnetic head M by the actuated contact $u2$. The operations of the relay C are however over its contact $c$ and contact $u4$ in operated position transmitted to the line terminal F which may be connected with a teleprinter or a line or other transmission channel.

The signal carrier AT is as already mentioned preferably a tape. Other forms of carriers may however be analogously used, for example, carriers in the form of wires, disks, belts or drums.

The illustrated embodiment has been given as an example only. In place of the described single tone recording with one frequency there may be provided double tone recording or the recording may employ other suitable kinds of current. The described distortion correction device likewise represents only one of several possibilities. A plurality of distortion correcting devices may be used and electronic distortion correcting means may be employed in place of the mechanical embodiment shown.

Changes may be made within the scope and spirit of the appended claims which define what is believed to be new and desired to have protected by Letters Patent.

We claim:

1. Apparatus for magnetically storing groups of impulses comprising a magnetic recorder having a magnetizable carrier and operating means for advancing such carrier relative to the magnetic head thereof, means for delivering successive groups of impulses, a delay device for receiving said impulses, actuating means coacting with said delay device for causing said operating means to initiate the advance of said carrier instantly responsive to the start of delivery of said impulses so as to accelerate said carrier to full operating speed prior to the recording thereon of said groups of impulses, and means controlled by said delay device for thereafter feeding said impulses to said carrier for recording such impulses thereon.

2. The apparatus defined in claim 1, comprising means in said delay device for correcting distortion of said impulses coincident with the delayed feeding thereof to said carrier.

3. The apparatus defined in claim 1, comprising a device for correcting impulse distortion which constitutes said delay device.

4. The apparatus defined in claim 1, comprising a single-shaft mechanical teleprinter impulse distortion correcting device which constitutes said delay device.

5. The apparatus defined in claim 1, comprising means in said delay device for correcting distortion of said impulses, means for releasing said impulses recorded on said carrier, and switching means for controlling the release of said impulses over said delay device to correct distortion thereof incident to release of such impulses from said carrier.

6. The apparatus defined in claim 1, comprising an impulse delivery control relay forming part of said means for delivering successive groups of impulses, a control contact governed by said control relay for delivering said impulses to said delay device, means in said delay device for correcting distortion of said impulses, and means for feeding said corrected impulses to said magnetic head to record such impulses on said carrier.

7. The apparatus defined in claim 1, comprising an impulse delivery control relay forming part of said means for delivering successive groups of impulses, a control contact governed by said control relay for delivering said impulses to said delay device, means in said delay device for correcting distortion of said impulses, means for feeding said corrected impulses to said magnetic head to record such impulses on said carrier, and means for reproducing said recorded impulses, said reproducing means comprising an amplifier, first switching means for connecting said magnetic head with the input side of said amplifier, second switching means for connecting said impulse delivery control relay with the output side of said amplifier to cause operation of said control relay by the impulses recorded on said carrier for the purpose of causing actuation of the control contact governed by said control relay to deliver corresponding reproduced impulses to said delay device, said delay device being again operative to correct distortion of said reproduced impulses, a transmission circuit, a transmission relay operatively responsive to said corrected reproduced impulses, a transmission contact governed by said transmission relay, and third switching means for connecting said transmission contact with said transmission circuit to cause transmission of said reproduced corrected impulses over such circuit.

8. The apparatus defined in claim 1, comprising an impulse delivery control relay forming part of said means for delivering successive groups of impulses, a control contact governed by said control relay for delivering said impulses to said delay device, means in said delay device for correcting distortion of said impulses, means for feeding said corrected impulses to said magnetic head to record such impulses on said carrier, and means for reproducing said recorded impulses, said reproducing means comprising an amplifier, first switching means for connecting said magnetic head with the input side of said amplifier, second switching means for connecting said impulse delivery control relay with the output side of said amplifier to cause operation of said control relay by the impulses recorded on said carrier for the purpose of causing actuation of the control contact governed by said control relay to deliver corresponding reproduced impulses to said delay device, said delay device being again operative to correct distortion of said reproduced impulses, a transmission circuit, a transmission relay operatively responsive to said corrected reproduced impulses, a transmission contact governed by said transmission relay, third switching means for connecting said transmission contact with said transmission circuit to cause transmission of said reproduced corrected impulses over such circuit, and a common switch for actuating said first and second and third switching means.

References Cited in the file of this patent

UNITED STATES PATENTS 2,521,623 Arnot et al. ------------ Sept. 5, 1950